United States Patent [19]

Almquist et al.

[11] 4,136,303

[45] Jan. 23, 1979

[54] TORQUE LIMITING DRIVE WITH SLIP MONITOR

[75] Inventors: Hans Almquist; Lars-Olof Nilsson; Hans Skoog, all of Västerås, Sweden

[73] Assignee: ASEA Aktiebolag, Västerås, Sweden

[21] Appl. No.: 813,049

[22] Filed: Jul. 5, 1977

[30] Foreign Application Priority Data

Jul. 15, 1976 [SE] Sweden .................. 7608070

[51] Int. Cl.² ............................ H02P 5/52
[52] U.S. Cl. ...................... 318/52; 105/61
[58] Field of Search ........... 318/52, 434; 303/106; 105/61

[56] References Cited

U.S. PATENT DOCUMENTS

| 3,713,504 | 1/1973 | Shimer et al. | 318/52 X |
| 3,912,034 | 10/1975 | Pallof | 318/52 X |
| 4,035,698 | 7/1977 | Söderberg | 318/52 |
| 4,037,143 | 7/1977 | Söderberg | 318/52 |

*Primary Examiner*—B. Dobeck
*Attorney, Agent, or Firm*—Pollock, Vande Sande & Priddy

[57] ABSTRACT

A vehicle includes drive wheels and a motor connected thereto with torque controlling apparatus and a slip indicating device. Excessive slip indications per unit time are monitored and cause reduction in the torque applied by the motor until the slipping is overcome at which time torque is gradually increased.

8 Claims, 5 Drawing Figures

TORQUE LIMITING DRIVE WITH SLIP MONITOR

Field of the Invention

The present invention relates to a means in a motor driven vehicle comprising drive wheels and at least one drive motor connected to the drive wheels and having torque controlling members arranged to emit a signal indicating slipping as soon as the drive wheels start slipping or skidding.

BACKGROUND OF THE INVENTION

A slip-protecting device is previously known, for example, through U.S. patent application Ser. No. 407,505, filed Oct. 18, 1973, now U.S. Pat. No. 4,035,698, issued July 12, 1977, which device is designed to be used in electrically operated vehicles, preferably railbound vehicles. This known slip-protecting device comprises slip-indicating members which sense the time derivative of the speed of the drive wheels and emit a slip-indicating signal when this derivative exceeds a predetermined value, which is chosen so that it is not reached during normal acceleration without slipping. This known slip protection is arranged so as to rapidly reduce the traction of the vehicle, upon incipient slipping, to zero or to a low value. Slipping is rapidly counteracted and when the drive wheels have regained adhesive contact with the rail traction is increased to its original value. During the time required for counteracting slipping, traction is reduced to a low value, in a typical case a few tenths of seconds or a few seconds. Each slipping therefore results in a loss of traction for a corresponding period of time. If the traction of the vehicle is set at a value which is too high in relation to the adhesive properties of the rails, slipping will occur relatively often, that is, the traction will vary between its maximum value and a low value. This can result in considerable reduction of the average value of tractive force.

It is therefore a prime object of the present invention to provide a motor-driven vehicle in which the above-mentioned drawback is avoided and by means of which a considerable increase of the available traction can be obtained, particularly in the case of poor adhesion conditions.

SUMMARY OF THE INVENTION

A motor-driven vehicle according to the invention is characterized in that the slip-indicating signal is supplied to a torque-reducing device where the time between consecutive slip occasions is compared with a predetermined value and, if said time is lower than said value, the available drive torque is successively reduced.

BRIEF DESCRIPTION OF THE DRAWINGS

In the following the invention will be described in more detail with reference to the accompanying FIGS. 1-4.

DETAILED DESCRIPTION OF A PREFERRED EMBODIMENT

Figure 1:
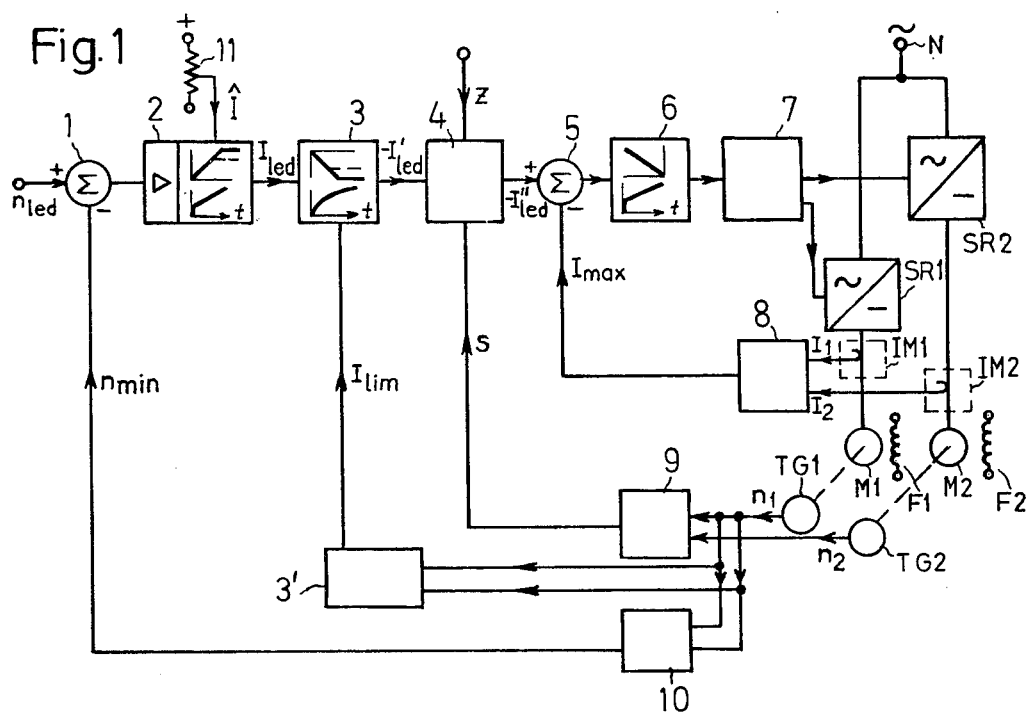
FIG. 1 shows an electrical block diagram of a complete electrical equipment for a vehicle according to the invention.

FIG. 1 shows an embodiment of drive equipment for an electrically operated rail vehicle. Two conventional thyristor converters SR1 and SR2 are fed from an AC network N, which may be constituted by the contact line. DC terminals of each thyristor converter are connected to a drive motor M1 and M2, respectively. The motors have field windings F1 and F2, which are supplied with direct current from conventional supply devices (not shown). Each motor is mechanically coupled, for example, through a gear wheel, to its own separate set of drive wheels. Also tachometer generators TG1 and TG2 are mechanically coupled to the motors, said generators emitting signals $n_1$ and $n_2$, respectively, which correspond to the speed of the associated motor. The direct currents of the two motors are sensed by current measurement devices IM1 and IM2, whose output signals I1 and I2, respectively are supplied to a selector switch 8. This switch can be in the form of a conventional diode circuit and its output signal $I_{max}$ consists of the greater of the two input signals I1 and I2. The two speed signals $n_1$ and $n_2$ are supplied to another selector switch 10. Similarly, this switch may consist of a conventional diode selector switch, and its output signal $n_{min}$ consists at each moment of the lower of the two input signals $n_1$ and $n_2$. A speed reference value $n_{led}$ which may be obtained, for example, from a potentiometer operated by the operator, is supplied together with value $n_{min}$ to a comparison circuit 1. In this comparison circuit, the difference between the two quantities is formed, and this difference is supplied to a speed regulator 2, known per se, with PI characteristics. The speed regulator delivers an output signal $I_{led}$ which is the current reference value for the subsequent current regulation circuit. $I_{led}$ is limited upwards to an adjustable and variable value $\hat{I}$. This value may be set, for example, as shown in the Figure, with the help of a potentiometer 11 which is operated by the vehicle operator. The current reference value $I_{led}$ is supplied to a current limiting unit 3. This has a certain delaying characteristic, so that abrupt changes of the tractive power, caused by the operator or by the speed regulation system, are smoothed. The circuit 3 further sets an upper limit to $I_{led}$ to a value equal to $I_{lim}$. This may vary in dependence on, for example, the voltage of network N, in dependence on the temperature, etc. However, $I_{lim}$ may also be influenced by a so-called dynamic slip-protection device of the type which is disclosed in the referenced U.S. Patent application the disclosure of which is incorporated by reference herein. Such a slip-protection circuit is indicated by 3' in FIG. 1. The current reference value $I'_{led}$ thus limited and possibly delayed, is supplied to a comparison device 5 by way of a torque-adjusting unit 4, the function of which will be described in more detail below. The actual current value $I_{max}$ is also supplied to the circuit 5. The current error is thus formed in circuit 5 and is supplied to a conventional current regulator 6 with PI characteristics. The output signal of the current regulator is supplied to a control pulse device 7 which controls the output of the converters in such a manner that the actual current value $I_{max}$ tends to follow the current reference.

A slip-indicating device 9 is supplied with the two speed signals $n_1$ and $n_2$ and on the occasion of each slipping it emits a slip-indicating signal to the torque-reducing unit 4. Also a signal z is supplied to said unit 4, which signal may consist of a logical signal which is, for example, "0" for driving and "1" for braking. The function of the signal z is to supply the unit 4 with an indication each time the drive motors change from driving to retardation and vice versa.

Figure 4A:
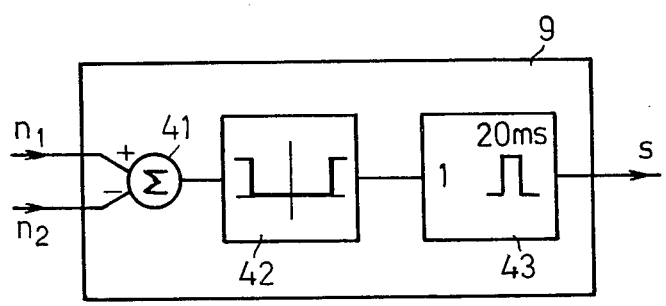
FIGS. 4A and 4B show two different alternative embodiments of the slip-indicating member according to the invention.

FIG. 4A shows an embodiment of the slip-indicating circuit 9 in FIG. 1. Signals $n_1$ and $n_2$ are supplied to a comparison circuit 41, which forms the difference between said two signals. The difference is supplied to a level sensing circuit 42 which emits an output signal, which is "0" if the absolute value of said difference is below a predetermined level and which is "1" if the absolute value exceeds this level. The output signal from unit 42 is supplied to a monostable circuit 43 which emits a short pulse each time that the signal from unit 42 changes from "0" to "1." In the example shown the pulse has a duration of 20 ms. In a vehicle of the kind mentioned generally one set of drive wheels always starts slipping earlier than the other set, and the difference between the two motor speeds is, therefore, a good indication of slipping. Each time slip occurs a short pulse will therefore be emitted by the slip-indicating unit 9 and these pulses constitute the output signal s of the unit.

Figure 4B:
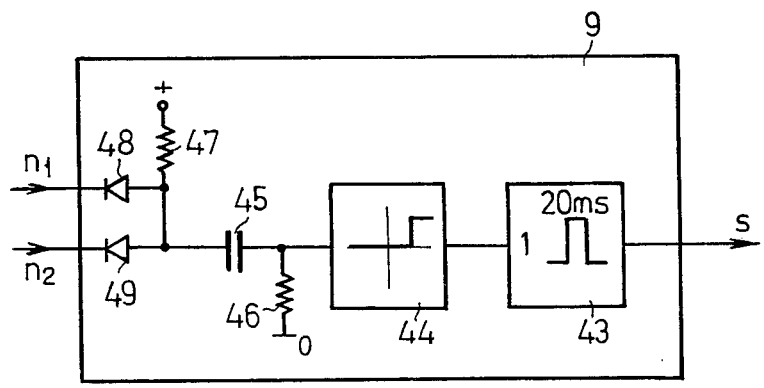

FIG. 4B shows another example of a possible arrangement of a slip-indicating member according to the invention. Signals $n_1$ and $n_2$ are supplied to a selector switch consisting of diodes 48 and 49 and resistor 47. The output signal of the selector switch is, at each moment, equal to the lower of the two input signals. The output signal of the selector switch is supplied to a differentiating circuit which is schematically shown in the Figure as consisting of a capacitor 45 and a resistor 46. The output signal from this circuit consists of the time derivative of the smaller of the two speed signals. The output signal from the differentiating circuit is supplied to a level detector 44 which emits an output signal if the derivative exceeds a predetermined value, suitably chosen so that it is not reached in case of normal acceleration with no slipping. The output signal from the level detector is supplied to a monostable circuit 43, which emits a short (20 ms) pulse each time the signal from the level detector switches from "0" to "1." In the embodiment shown, circuit 9 emits an output signal when the time derivative of the speed of the slowest rotating drive wheels exceeds the set limit value, that is, when all the drive wheels are slipping. Alternatively, of course, the circuit may be formed so that instead the greater of the two speed signals $n_1$ and $n_2$ is sensed and differentiated, an indication of slipping thus being obtained as soon as a drive wheel slips.

Figure 2:
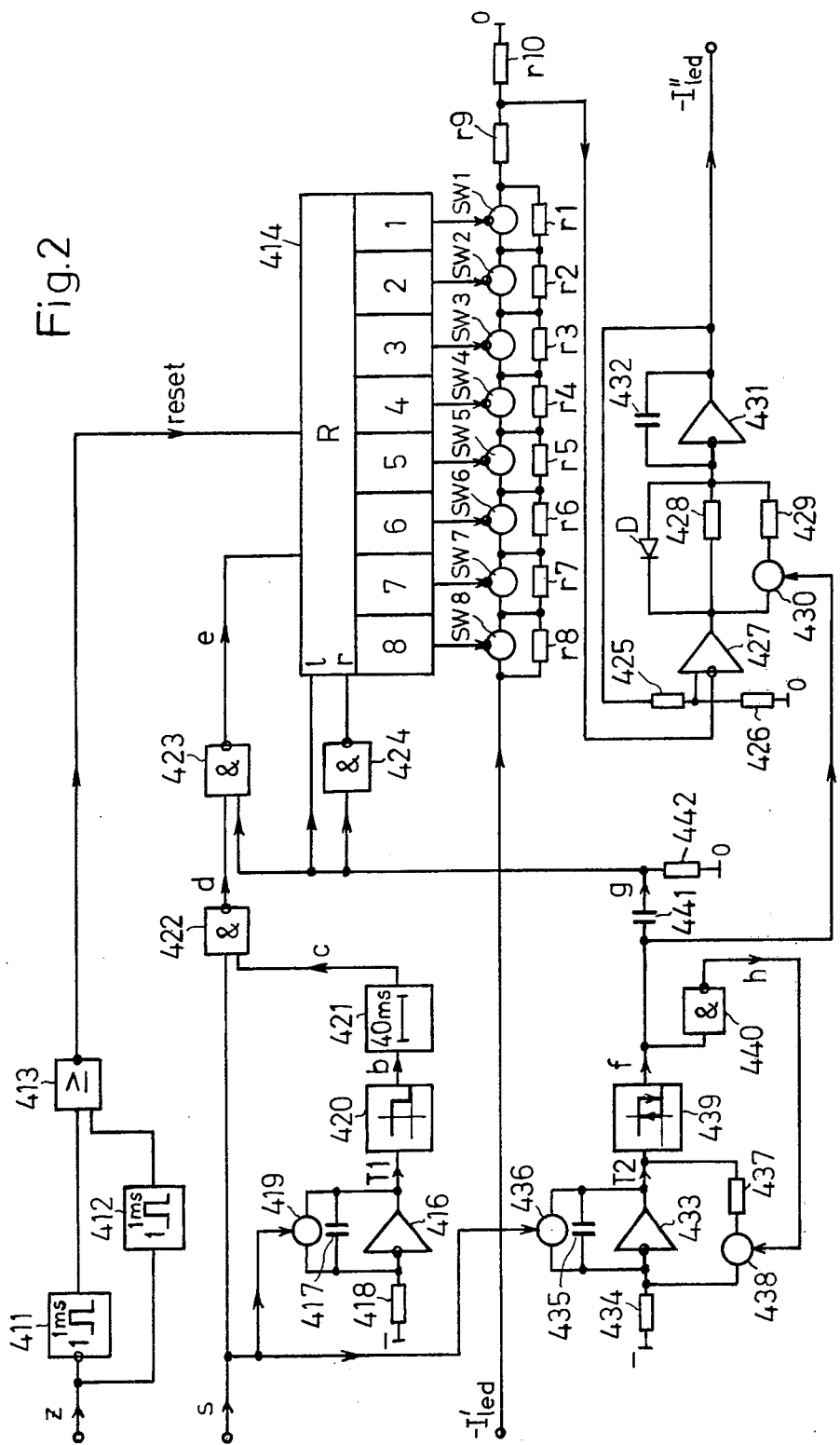
FIG. 2 shows a detailed example of a preferred embodiment of the torque-reducing member according to the invention.

FIG. 2 shows in detail an embodiment of the torque-adjusting member 4 in FIG. 1. The current reference value $I'_{led}$ from the current limiter 3 is supplied to a potentiometer coupling consisting of resistors r1–r10 and current switches SW1–SW8. The switches, which may be in the form of transistor switches, are controlled from the shift register 44. This shift register has eight outputs, one for each switch. Normally, a signal "0" is provided from each output of the shift register. All switches are then conducting, and the voltage division of the potentiometer coupling is determined by resistors r9 and r10. If slips begin occurring at short time intervals, the shift register will start stepping to the left in the figure, as will be described later on. A "1" is then fed into the stage 1, and upon each slipping (which succeeds the preceding slipping with a sufficiently close margin) the contents of the register are displaced one step to the left, that is, also the subsequent stage will have an output signal which is "1." For each such slipping, a resistor — first r1, then r2, etc. — will be connected in series with r9 in the potentiometer, the output voltage of said potentiometer is thus reduced by a predetermined percentage of the input voltage. The resistor values in the circuit may, for example, be chosen so that the first four reduction steps each have 5% and the subsequent four steps 10% each of the input signal. A maximum reduction of the output signal of the potentiometer will thus be obtained after nine slippings following sufficiently closely upon each other, and this reduction constitutes 60% of the input signal.

The output signal of the potentiometer is supplied to an amplifier 427 with input resistances 425 and 426. Thereafter, the signal is fed through an amplifier 431 with input resistors 428 and 429 and feedback capacitor 432. Resistor 429 is connected in parallel with resistor 428 through an electronic switch 430. Resistor 429 has considerably lower resistance than resistor 428. Normally, switch 430 is closed and the resistors are chosen so that the time constant of amplifier 431 is small, that is, its output signal follows, with a short delay, the changes of the input signal. When slipping has ceased the shift register will be stepped back slowly, as will be described below, which results in the output signal of the potentiometer being increased stepwise to its original value. It is desirable that the motor torque, that is, the current reference value ($I''_{led}$) of the motors, not be increased too abruptly. For this reason, the switch 430 is opened during the stepping up of the potentiometer, the resistance of the parallel combination of resistors 428 and 429, thus being considerably increased. This means that the time constant of amplifier 431 is increased, for example, to about 2 seconds, while the potentiometer is being stepped up. This leads to the desired effect, namely, that the increases in the current reference value and thus the motor torque will be soft instead of abrupt, which reduces the risk of renewed slipping. Diode D, which is connected in parallel to resistor 428 causes a decrease of $I'_{led}$ to immediately cause a change of $I'_{led}$ without delay.

The shift register is provided with two inputs designated l and r, respectively. These are supplied with a signal g, input l directly and input r through an inverting AND circuit 424. Further, the shift register is provided with a clock input, and each time a pulse e is supplied to the register through this input, the contents of the shift register are stepped one step to the right or to the left. If the input signal g is a "1," the contents are moved one step to the left in the Figure upon each clock pulse, and if the signal g is "0," the contents are moved one step to the right. The clock pulses are received from an inverting AND circuit 423 to which signals d and g are supplied. Normally both these signals are "1." When slipping occurs sufficiently frequently the signal d will temporarily drop to "0" upon each slipping occurrence, a clock pulse then being supplied to the shift register. The signal g is then "1" and the contents of the shift register are moved one step to the left in the figure at the occurrence of each slip. If slipping occurs at long intervals, or if there are no slips at all, the signal g will periodically, at a predetermined frequency, drop to "0" for short intervals. Each such "0" pulse results in a clock pulse being delivered to the shift register, whose contents are stepped one step to the right, and this will go on until all shift register steps have been set at zero.

The shift register is also provided with a reset input R which is supplied with a reset signal at each transition between driving and braking and vice versa of the drive motors. A signal z which is, for example, "1" when driving and "0" when braking, is supplied to the monostable flip-flops 411 and 412. When changing from driving to braking, flip-flop 411 delivers a pulse and when changing from braking to driving flip-flop 412 delivers a pulse. The pulses may have a pulse length of, for example, 1 ms. The signals are supplied to the reset input R of the shift register by way of an inverting OR circuit. How signal z is derived has not been shown in the Figure, because this depends on how the equipment for switching between driving and braking has been constructed in the vehicle in question. For example, the switching between driving and braking may be performed by reversing the polarity of the current direction through the field winding of the drive motors. Signal z can then be obtained directly from the current reverser or from the logical circuits controlling the current reverser. The reset function now mentioned makes it possible to achieve driving after preceding braking (as well as braking after preceding driving) immediately with full traction, independent of any preceding slipping during the previous operating condition.

At the occurrence of each slip, there is obtained a pulse with a pulse length of, for example, 20 ms. from the slip-indicating member 9. These pulses (signal s) are supplied to the AND circuit 422 as well as to the integrator 416–417–418. At each slip occurrence the slip-indicating pulse sets the integrator to zero with the help of switch 419 by shorting capacitor 417. Immediately after each reset the output signal of the integrator starts changing with a constant rate, and after a predetermined time the output signal has reached a value such that the output signal from level detector 420 switches from "1" to "0." The integrator and level detector 420 operates as a timer. The integration time $t_1$ may, for example, be 3 seconds. During the time $t_1$ after each slip, the output signal from level detector 420 is "1," and a renewed slip signal, which is supplied to the AND circuit 422 during this time, will therefore cause a clock pulse and a stepping of the contents of the shift register. In order that the first slip indication shall not provide a clock pulse to the shift register, a delay circuit 421 is arranged between level detector 420 and AND circuit 422. This circuit may have a delay of, for example, 40 ms. when the input signal changes from "0" to "1."

Figure 3:
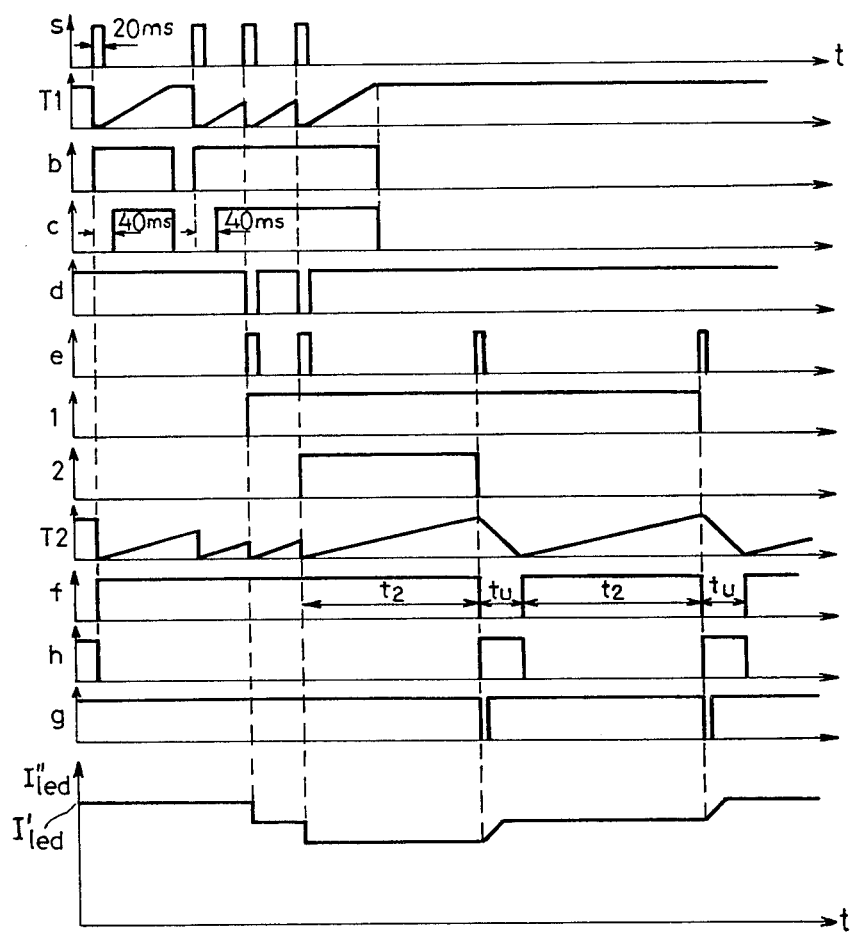
FIG. 3 shows a few of the signals occurring in the circuits according to FIGS. 1 and 2 as functions of time.

FIG. 3 shows the time behavior of the slip signal s, the output signal T1 of the integrator, the output signal b from level detector 420, the output signal c from delay circuit 421, the output signal d from AND circuit 422, the clock pulses e, and the output signals from the first two stages 1 and 2, respectively, of the shift register. There is also shown the current reference value $I''_{led}$ which is delivered from the torque-reducing circuit 4 (provided the current reference value $I'_{led}$ is constant). It should be noted that in FIG. 3 the lengths of the slip-indicating pulses s and the time delay pulses c of circuit 421 are greatly exaggerated. In FIG. 3, the distance between the first and the second slip pulse is larger than $t_1$ and no clock pulse is therefore delivered to the shift register. The time difference between the second and the third and the third and the fourth slip-indicating pulses in the Figure is, on the other hand, smaller than $t_1$. At the third slip pulse in the Figure, a clock pulse e is therefore received by the shift register, and output signal from the first stage of said register then switching from "0" to "1" and the current reference $I'_{led}$ being reduced by a first step, for example 5% of the incoming reference value $I'_{led}$. At the fourth slip-indicating pulse s in the Figure, a further clock pulse e is received by the shift register, the second stage of this register then delivering an output signal which becomes "1." In this way, a further stepwise reduction of the delivered current reference value $I'_{led}$ is obtained, for example, by another 5% of the incoming value $I'_{led}$.

It has been assumed in the Figure that after the fourth slip-indicating pulse no further slip-indications are obtained. Thus, the system shall now increase the current reference value to the original value ($I'_{led}$). This is taken care of by an integrator which is built up of amplifier 433 with feedback elements. The amplifier has a feedback capacitor 435 which is connected in parallel with an electronic switch 436. The slip-indicating pulses s are fed to said switch, which results in each slip indicating pulse setting the integrator to zero. The time constant of the integrator is determined by feedback capacitor 435 and input resistor 434. The output signal T2 of the integrator is supplied to a level detector 439, the output signal of which switches from "1" to "0" when the output signal T2 of the integrator reaches a predetermined positive level. The elements included are chosen so that the output signal f of circuit 439 switches over, for example, 7 seconds after the integrator has been set to zero, provided that no resetting has occurred in the meantime. As will be clear from FIG. 3, signal T2 has reached the switching level for circuit 439 when the time $t_2$ has lapsed after the last slip pulse. Signal f then switches from "1" to "0." Through the differentiating circuit, consisting of capacitor 441 and resistor 442, there is obtained a negative pulse g to the AND circuit 423 and therefore a clock pulse to the shift register. The negative pulse g will at the same time deliver a signal "1" through AND circuit 424, to the input r of the shift register, which results in the clock pulse stepping the contents of the shift register one stage to the right in the Figure. Signal f is supplied to an AND circuit 440 whose output signal is h. At the same time as f switches from "1" to "0," h will thus pass from "0" to "1." The electronic switch 438 is thereby closed, and the integrator is discharged through the discharge resistor 437. The time of discharge may, for example, be chosen to be one or a few seconds, and it is designated $t_u$ in the Figure. When the integrator is discharged, that is, when signal T2 has become "0" or close to "0," signal f switches from "0" to "1," signal h changes from "1" to "0," switch 438 is opened and the integrator starts to charge again. After time $t_2$ a new clock pulse is obtained to the shift register in the same way, and the register steps its contents a further stage to the right in the Figure. The shift register has now been stepped back to the original position, that is, the output signals from all the steps of the register are now "0." This means that the potentiometer has now regained its original condition, and the current reference value $I''_{led}$ has returned to its original value, that is $I''_{led}$ is now equal to $I'_{led}$. As seen in the Figure, the increases of $I''_{led}$ will be gradual because the electronic switch 430 switches in the great time constant of the amplifier 431 when stepping up the current reference value.

As is clear from the above description, the inventive apparatus will provide an adjustment — a relatively slow adjustment — of the current reference value to the adhesion conditions prevailing at the time, so that the slip indication frequency is maintained at a limited value. The system works as a closed loop control circuit which controls the slip indication frequency (the frequency of slips occurring) constantly so that it does not exceed a certain preset value. As described above, the system permits a maximum of one slip indication to occur within time of $t_1$ s, and if this slip indication frequency tends to become exceeded the system will decrease the current reference value so that the slip frequency does not exceed the desired value. It has been found that this results in such a good adjustment of the maximally available traction to the varying adhesion conditions that a very considerable increase of the vehicle traction is obtained.

What is claimed is:

1. In a motor driven vehicle including drive wheels and at least one drive motor coupled thereto, a torque controlling device for controlling the drive torque of said drive motor and slip indicating means for providing a slip signal when said drive wheels are subjected to slipping wherein the improvement comprises:
   means responsive to successive occurences of said slip signal for comparing elapsed time between successive slip signals with a predetermined time, and
   torque adjusting means for reducing available drive torque of said motor when said elapsed time is less than said predetermined time.

2. The device of claim 1 in which said torque adjusting means successively reduces said available drive torque when successive of said elapsed times are less than said predetermined time.

3. The device of claim 1 in which said torque adjusting means increases said available drive torque, after a reduction thereof, if said elapsed time exceeds said predetermined value.

4. The device of claim 3 in which said torque adjusting means increases said available drive torque, after successive reductions thereof, if successive of said elapsed times exceed said predetermined value.

5. The device of claim 1 in which said torque adjusting means reduces said available drive torque in predetermined steps.

6. The device of claim 1 in which said drive motor is an electric motor and said torque controlling device includes first circuit means for controlling motor current with first means to generate a reference value $I'_{led}$ for said first circuit means and in which said torque adjusting means reduces said reference value $I'_{led}$.

7. The device of claim 6 in which said torque adjusting means includes:
   a controllable voltage divider to which said reference value $I'_{led}$ is coupled and from which a controllable portion $I''_{led}$ is coupled to said first circuit means.

8. The device of claim 7 which further includes:
   a shift register coupled to and controlling said controllable voltage divider, and
   means for shifting said shift register in one direction or another depending on whether said elapsed time is greater or less than said predetermined value.

* * * * *